United States Patent [19]
Speciner et al.

[11] Patent Number: 5,959,867
[45] Date of Patent: *Sep. 28, 1999

[54] COMPUTER SYSTEM AND PROCESS FOR EFFICIENT PROCESSING OF A PAGE DESCRIPTION USING A DISPLAY LIST

[75] Inventors: Michael Speciner, Acton; Carl Mikkelsen, Sudbury, both of Mass.

[73] Assignee: Splash Technology, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/846,844

[22] Filed: May 1, 1997

Related U.S. Application Data

[63] Continuation of application No. 08/719,256, Sep. 24, 1996.

[51] Int. Cl.⁶ .................................................. G06F 17/00
[52] U.S. Cl. .................... 364/478.07; 707/103; 707/104; 707/502; 707/526
[58] Field of Search .............................. 364/478.07, 410, 364/419.03, 419.07; 395/600, 144, 145, 146, 147, 148, 112, 133, 134, 135, 163, 161, 160; 707/103, 104, 500, 502, 526

[56] References Cited

U.S. PATENT DOCUMENTS

| | | | |
|---|---|---|---|
| 3,921,135 | 11/1975 | Komaru et al. | 340/146.3 |
| 4,028,731 | 6/1977 | Arps et al. | 358/260 |
| 4,409,621 | 10/1983 | Richards et al. | 358/260 |

(List continued on next page.)

FOREIGN PATENT DOCUMENTS

| | | |
|---|---|---|
| 0 119 720 A2 | 9/1984 | European Pat. Off. . |
| 0 146 714 A2 | 7/1985 | European Pat. Off. . |
| 0 235 456 A2 | 9/1987 | European Pat. Off. . |
| 0 320 014 A2 | 6/1989 | European Pat. Off. . |
| 0 378 316 A1 | 7/1990 | European Pat. Off. . |
| 0 402 016 A2 | 12/1990 | European Pat. Off. . |
| 0 411 232 A2 | 2/1991 | European Pat. Off. . |
| 0 475 601 A3 | 3/1992 | European Pat. Off. . |
| 0 512 174 A1 | 11/1992 | European Pat. Off. . |
| 0 583 107 A2 | 2/1994 | European Pat. Off. . |
| 0 585 074 A2 | 3/1994 | European Pat. Off. . |
| 0 586 074 A2 | 3/1994 | European Pat. Off. . |
| 0 597 571 A2 | 5/1994 | European Pat. Off. . |
| 0 609 985 A2 | 8/1994 | European Pat. Off. . |
| 0 613 102 A1 | 8/1994 | European Pat. Off. . |
| 0 764 918 A2 | 3/1997 | European Pat. Off. . |
| 2 702 580 A1 | 9/1994 | France . |
| 38 16627 A1 | 11/1989 | Germany . |
| Wo 96/39681 | 12/1996 | WIPO . |

OTHER PUBLICATIONS

PCT, "International Search Report" for International Application No. PCT/US 97/16734, filed on Sep. 9, 1997.

*Primary Examiner*—William Grant
*Assistant Examiner*—Ramesh Patel
*Attorney, Agent, or Firm*—Wolf, Greenfield & Sacks, P.C.

[57] ABSTRACT

A page description language is interpreted by an interpreter which outputs successive object definitions. Each object definition is conditionally added to a display list. Based on certain conditions, the display list is rendered and cleared at various times during the interpretation of the page description. If an object definition describes an image object, the display list is rendered and cleared and the image object is added to the display list. If any objects are clipped in the display list, a corresponding clip object definition output from the interpreter is also ensured to exist within the display list. The display list is also rendered and cleared if it becomes too big in size. Clipping state changes of output object definitions from the interpreter also cause the display list to be rendered and cleared. By conditionally rendering the display list during interpretation, memory, storage, speed and processing requirements are improved for page description processing.

18 Claims, 7 Drawing Sheets

U.S. PATENT DOCUMENTS

| | | | |
|---|---|---|---|
| 4,467,363 | 8/1984 | Tench, Jr. | 358/261 |
| 4,580,162 | 4/1986 | Mori | 358/135 |
| 4,725,815 | 2/1988 | Mitchell et al. | 340/347 |
| 4,791,680 | 12/1988 | Yokoe et al. | 382/56 |
| 4,868,653 | 9/1989 | Golin et al. | 358/133 |
| 4,875,174 | 10/1989 | Olodort et al. | 364/519 |
| 4,949,188 | 8/1990 | Sato | 358/448 |
| 4,965,751 | 10/1990 | Thayer et al. | 364/521 |
| 5,034,804 | 7/1991 | Sasaki et al. | 358/41 |
| 5,050,100 | 9/1991 | Damon et al. | 364/514 |
| 5,056,044 | 10/1991 | Frederickson et al. | 364/521 |
| 5,068,805 | 11/1991 | Tsuzuki | 395/164 |
| 5,079,630 | 1/1992 | Golin et al. | 358/133 |
| 5,087,979 | 2/1992 | Schaertel | 358/296 |
| 5,095,520 | 3/1992 | Kim | 395/101 |
| 5,122,873 | 6/1992 | Golin | 358/133 |
| 5,129,049 | 7/1992 | Cuzzo et al. | 395/113 |
| 5,146,544 | 9/1992 | Altham et al. | 395/115 |
| 5,146,548 | 9/1992 | Bijnagte | 395/117 |
| 5,150,454 | 9/1992 | Wood et al. | 395/113 |
| 5,151,949 | 9/1992 | Miyata | 382/9 |
| 5,185,599 | 2/1993 | Doornink et al. | 347/747 |
| 5,199,803 | 4/1993 | Shimizu et al. | 400/121 |
| 5,204,738 | 4/1993 | Aragaki | 358/75 |
| 5,206,735 | 4/1993 | Gauronski et al. | 358/296 |
| 5,207,517 | 5/1993 | Ito | 400/121 |
| 5,208,676 | 5/1993 | Inui | 358/296 |
| 5,210,623 | 5/1993 | Weldy | 358/458 |
| 5,231,695 | 7/1993 | Harrington | 395/134 |
| 5,241,397 | 8/1993 | Yamada | 358/296 |
| 5,263,136 | 11/1993 | DeAguiar et al. | 395/164 |
| 5,270,728 | 12/1993 | Lund et al. | 346/1.1 |
| 5,272,768 | 12/1993 | Bauman et al. | 395/110 |
| 5,276,780 | 1/1994 | Sugiura | 395/116 |
| 5,295,233 | 3/1994 | Ota | 395/115 |
| 5,297,217 | 3/1994 | Hamilton, Jr. et al. | 382/41 |
| 5,299,292 | 3/1994 | Kadowaki et al. | 395/108 |
| 5,299,310 | 3/1994 | Motoyama | 395/165 |
| 5,303,334 | 4/1994 | Snyder et al. | 395/109 |
| 5,315,693 | 5/1994 | Hirosawa | 395/128 |
| 5,315,696 | 5/1994 | Case et al. | 395/133 |
| 5,315,698 | 5/1994 | Case et al. | 395/162 |
| 5,321,810 | 6/1994 | Case et al. | 395/166 |
| 5,337,258 | 8/1994 | Dennis | 364/551.01 |
| 5,341,472 | 8/1994 | Leak | 395/166 |
| 5,347,368 | 9/1994 | Mochizuki | 358/296 |
| 5,349,647 | 9/1994 | Freiburg et al. | 395/115 |
| 5,354,135 | 10/1994 | Sakagami et al. | 400/124 |
| 5,355,441 | 10/1994 | Kawai et al. | 395/115 |
| 5,363,107 | 11/1994 | Gertz et al. | 342/26 |
| 5,369,533 | 11/1994 | Ottesen et al. | 360/51 |
| 5,374,943 | 12/1994 | Lehmann et al. | 347/9 |
| 5,374,957 | 12/1994 | Sharma | 348/391 |
| 5,377,312 | 12/1994 | Kobauasio | 395/116 |
| 5,384,912 | 1/1995 | Ogrinc et al. | 395/164 |
| 5,387,783 | 2/1995 | Mihm et al. | 235/375 |
| 5,413,321 | 5/1995 | Banks et al. | 270/58 |
| 5,428,423 | 6/1995 | Clark | 355/77 |
| 5,438,653 | 8/1995 | Boenke et al. | 395/131 |
| 5,445,367 | 8/1995 | Long | 270/1.1 |
| 5,457,549 | 10/1995 | Kumada et al. | 358/530 |
| 5,459,818 | 10/1995 | Grant et al. | 395/114 |
| 5,465,304 | 11/1995 | Cullen et al. | 382/176 |
| 5,471,563 | 11/1995 | Dennis et al. | 395/114 |
| 5,479,587 | 12/1995 | Campbell et al. | 395/116 |
| 5,483,622 | 1/1996 | Zimmerman et al. | 395/114 |
| 5,493,105 | 2/1996 | Desai | 235/375 |
| 5,497,498 | 3/1996 | Taylor | 395/800 |
| 5,500,924 | 3/1996 | deSilva et al. | 395/129 |
| 5,500,928 | 3/1996 | Cook et al. | 395/133 |
| 5,502,636 | 3/1996 | Clarke | 364/401 |
| 5,504,842 | 4/1996 | Gantile | 395/114 |
| 5,504,843 | 4/1996 | Catapano et al. | 395/115 |
| 5,506,944 | 4/1996 | Gentile | 395/114 |
| 5,506,985 | 4/1996 | Motoyama et al. | 395/600 |
| 5,509,115 | 4/1996 | Butterfield et al. | 395/147 |
| 5,511,156 | 4/1996 | Nagasaka | 395/133 |
| 5,532,838 | 7/1996 | Barbari | 358/400 |
| 5,539,865 | 7/1996 | Gentile | 395/115 |
| 5,544,290 | 8/1996 | Gentile | 395/115 |
| 5,552,898 | 9/1996 | Deschuytere | 358/426 |
| 5,594,860 | 1/1997 | Gauthier | 395/501 |
| 5,596,690 | 1/1997 | Stone et al. | 395/133 |
| 5,600,768 | 2/1997 | Andresen | 395/135 |
| 5,602,976 | 2/1997 | Cooper et al. | 395/116 |
| 5,615,314 | 3/1997 | Schoenzeit et al. | 395/114 |
| 5,625,712 | 4/1997 | Schoenzeit et al. | 382/245 |
| 5,638,498 | 6/1997 | Tyler et al. | 395/117 |
| 5,668,931 | 9/1997 | Dermer | 395/104 |
| 5,745,121 | 4/1998 | Politis | 345/433 |

COMPUTER SYSTEM AND PROCESS FOR EFFICIENT PROCESSING OF A PAGE DESCRIPTION USING A DISPLAY LIST

CROSS-REFERENCE TO RELATED APPLICATIONS

This application is a continuing application claiming the benefit under 35 U.S.C. §120 of U.S. application Ser. No. 08/719,256 filed Sep. 24, 1996, entitled COMPUTER SYSTEM FOR PROCESSING IMAGES USING A VIRTUAL FRAME BUFFER, which is hereby incorporated by reference.

FIELD OF THE INVENTION

The present invention is related to computer systems and processes for processing page descriptions of documents, including combinations of text, graphics, and other images. More particularly, the present invention is related to techniques for generating and processing display lists containing object definitions produced by interpretation of a page description.

BACKGROUND OF THE INVENTION

Most computer systems use a form of raster image to display image data on an output device such as a cathode ray tube (CRT) monitor, liquid crystal display (LCD), or a printing device such as a color laser copier. A raster image is represented as a series of scan lines of pixels, wherein pixels are accessed, and each scan line is processed sequentially by the output device. Raster image data is produced by a process called rendering, and typically is stored in a memory device called a frame buffer, which may be accessed by the output device. A frame buffer typically is large enough to store image data that represents a "page," which corresponds to a printed or displayed page of data. A document may be composed of several pages.

A document typically may be defined using a page description language. Page description languages, such as the POSTSCRIPT language produced by Adobe Systems, Inc., provide commands similar to a programming language which may be used to describe the visual representation of a page. A page description language describes the appearance of text, graphical shapes, and sampled images in a page to be displayed on an output device. A document written in a page description language such as the POSTSCRIPT language may be used to communicate the description of pages of the document from a composition system such as a word processor on a computer, to a display system such as a laser printer. To display or print the document, the page description language is interpreted by an interpreter, or may be compiled or translated, and is then rendered into image data.

Interpreters of page description languages typically process images in one of two modes: band mode and frame mode. In band mode, the entire page description is interpreted, and a list of every imaging operation, called a display list, is built including all the data needed to image the page. The rendering device renders the display list after the display list is fully created. A display list can grow to be very large. A large display list must be stored temporarily on secondary storage, i.e., is swapped from main memory, which requires repeated extra processing steps to both read from and write to the display list. Then, during rendering of the display list to create bands of image data for the output device, swapping also may occur which further reduces performance.

In frame mode, on the other hand, a display list is not constructed. Instead, a full page image exists, and each imaging operation is immediately processed as it is encountered to update the full page image. Whereas a band mode processor traverses the output page image in an orderly fashion, sweeping from one edge to the opposite edge, a frame mode processor accesses the output page randomly. If this full page image does not fit in primary memory, frame mode processing may require swapping as the full page image is randomly accessed. Similarly, if the full page image is partially compressed, frame mode processing may require repeated decompression and compression of portions of the full page image as it is randomly accessed. Either of these possibilities significantly decreases processing throughput.

SUMMARY OF THE INVENTION

In the present invention, a page description is interpreted to produce a display list, similar to band mode operation, but the display list is periodically rendered and cleared while the page description is interpreted. The occurrence of several conditions may cause the display list to be rendered and cleared, such as a change in state of clipping of the objects in the display list, an occurrence of a sampled image object in the page description and an increase in size of the display list beyond a predetermined threshold. The occurrence of these conditions may be detected both before and after each new object definition is appended to the display list.

Accordingly, one aspect of the present invention is a computer-implemented process or computer system for processing a document in a page description language. In this process or system, the document is interpreted to produce a sequence of object definitions specifying an object in the document. For each object definition in the sequence of object definitions, occurrence of a condition created by the object definition is detected. The object definition is conditionally added to a display list according to the condition detected. The display list is rendered and cleared when occurrence of the condition is detected. The condition detected may be whether the object definition defines a sampled image, or, when each object definition has a clipping state indicating whether the object is clipped, whether the clipping state of the object definitions in the display list is different from the clipping state of the object definition. The condition detected also may be whether the display list has exceeded a predetermined size.

Another aspect of the present invention is a computer-implemented process or computer system for processing a document defined using a page description language to produce output image data. In this process or system, a sequence of object definitions is received from a page description interpreter that interprets the document, wherein each object definition has a clipping state indicating whether the object is clipped by a nonrectangular clipping path. A display list is provided. Initially the display list is empty. For each received object definition, if the display list is nonempty, then if the received object is a sampled image or if the object definitions in the display list have a clipping state different from the received object definition, the display list is rendered to provide a portion of the output image data and the display list is cleared. It is next determined whether the object definition has a corresponding clip object. When the object definition has a corresponding clip object, the process or system ensures that a clip object definition for the clip object is in the display list. In order to ensure that a clip object definition is in the display list, a clip object definition corresponding to the received object definition is first identified; if the identified clip object definition is not in the display list, the identified clip object definition is added to the display list. Next, the objects definition is appended to the display list. If the object definition is a sampled image or if the display list has exceeded a predetermined size, the display list is rendered to provide at least a portion of the output image data and the display list is cleared.

Another aspect of the invention is a system for processing a document defined using page description language. The system includes a page description interpreter having an input for receiving the document and an output which provides a sequence of object definitions defining partial content of a page of the document. A display list processor has an input for receiving each object definition in the sequence of object definitions and an output providing a display list of object definitions of a portion of a page of the document and an instruction when at least one condition occurs due to a received object definition. An image rendering apparatus has an input which receives the instruction from the display list processor and the display list and an output providing rendered image data of the portion of the page of the document defined by object definitions in the display list. In one embodiment, the page description interpreter and the conditional display list processor and the image rendering apparatus may all operate in parallel, concurrently with each other. The conditions that may occur due to an object definition include the display list exceeding a predetermined size, or when the object definition is a sampled image or, when each object definition has a clipping state indicating whether the object is clipped, when the clipping state of the object definitions in the display list is different from the clipping state of the received object definition.

The present invention thus provides a more efficient mechanism for processing documents in a page description language. By rendering the display list upon the occurrence of a sampled image object, or when object clipping in the display list changes, or when the display list exceeds a predetermined size, memory and storage requirements are optimized and swapping is kept to a minimum. In particular, this conditional rendering allows the display list to be kept to a manageable size, and therefore, swapping of the display list is minimized. In addition, by otherwise processing the document in a band mode, swapping of frame memory is minimized. Conditional rendering also increases the overall throughput of the process, since interpretation and rendering may be done in parallel.

DETAILED DESCRIPTION

The present invention will be more completely understood through the following detailed description which should be read in conjunction with the attached drawings in which similar reference numbers indicate similar structures.

Figure 1:
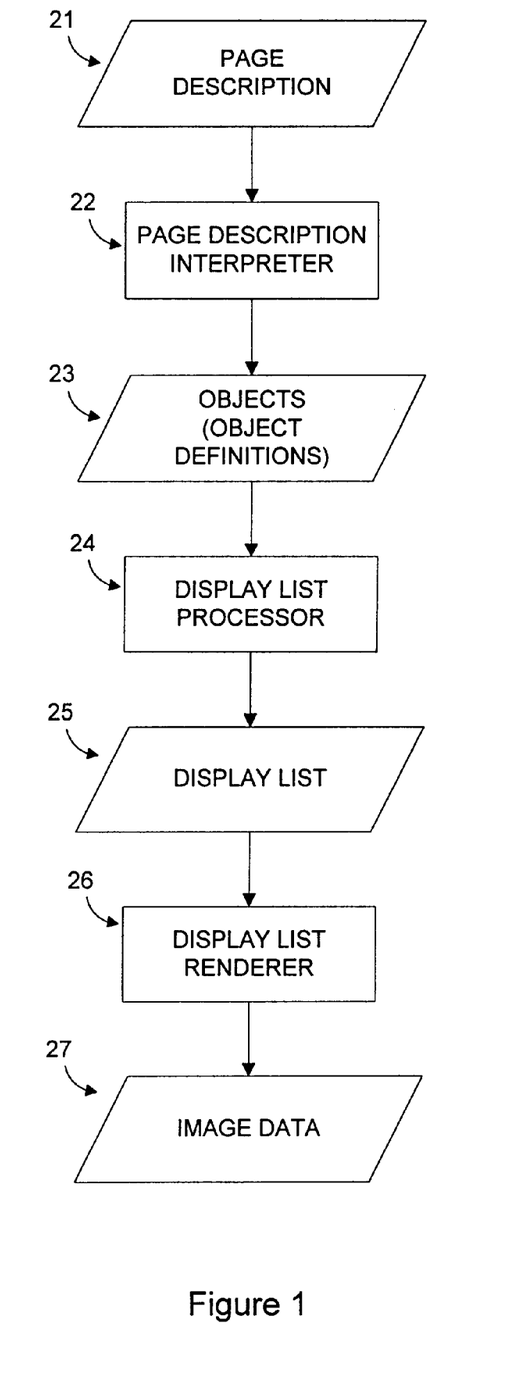
FIG. 1 is a block diagram illustrating the flow of information and processing of the present invention.

FIG. 1 is a block diagram illustrating an image processing system in one embodiment of the present invention. A page description 21 is a set of programming language statements, such as those used in the POSTSCRIPT language, which describes a page of document. To print or display the page, the page description 21 is input into a page description interpreter 22. The page description interpreter 22 interprets the page description 21 to produce a sequence of object definitions, represented by objects 23. A display list processor 24 receives objects 23 output from the page description interpreter 22 during interpretation of page description 21. The display list processor 24 produces a display list 25 comprising one or more object definitions. The display list is input into a display list renderer 26 which generates and outputs image data 27, for example, into a frame buffer. The frame buffer may contain actual image data or may provide for compression of the image data. The frame buffer providing compression is described in copending U.S. patent application Ser. No. 08/719,256. The process of generating image data from a display list is called rendering the display list. Rendered image data in a frame buffer may be displayed on an output device such as a video screen or output to a printer or copier, or may be saved either in secondary storage in a file or in memory for later use or further image processing.

Figure 2:
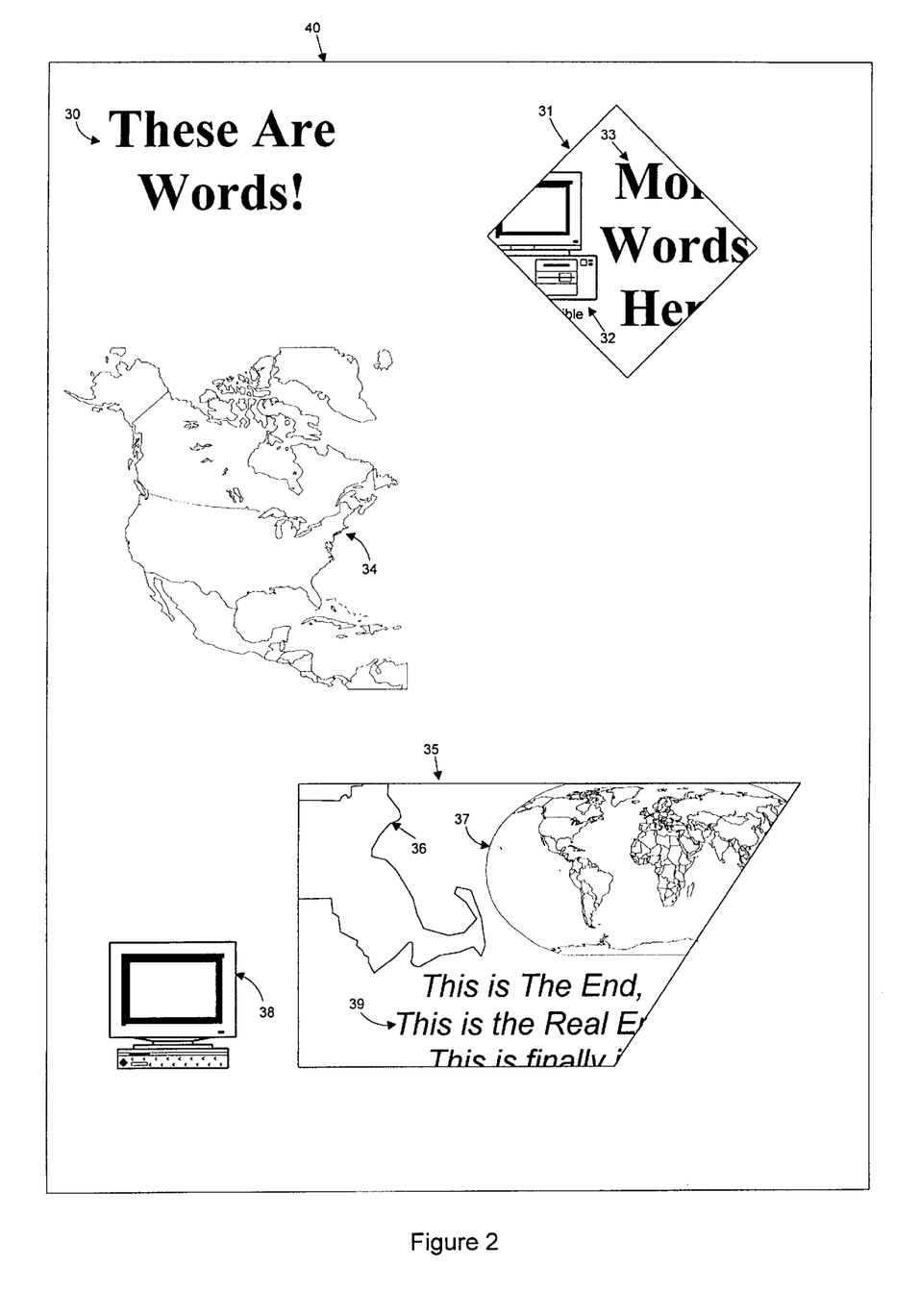
FIG. 2 is a diagram illustrating an example image of a page represented by a page description language.

FIG. 2 shows, by way of example, an image 40 which contains various objects 30–39, as they might appear as rendered. The objects 30–39 may be represented by one or more programming language statements in a page description (e.g., 21 of FIG. 1). This page description is interpreted by an interpreter 22 to provide object definitions 23 (FIG. 1) representing the objects 30–39 (FIG. 2). These object definitions are placed in a display list and are rendered to produce each of the objects 30–39 in the image 40.

The image 40 illustrates various types of objects. For example, objects 30, 33 and 39 are referred to as text objects. Text objects define text to be placed in the image data. Objects 34 and 37 are referred to as image objects. Image objects are generally larger in size and memory requirements than other types of objects. Image objects often refer to one or more image data files containing sampled image data to be rendered. For the sake of simplicity, however, FIG. 2 illustrates these sampled images as line drawings. Image data files may be stored separately from the page description, for example as a data file on a storage medium such as a hard disk. Objects 32, 36 and 38 in FIG. 2 are graphical objects. Graphical objects are usually simple shapes which may be described by a relatively small number of page description programming language statements.

Another type of object is a clip object. Clip objects define boundaries called clipping paths, such as shown at lines 31 and 35 in FIG. 2, which limit other objects. During interpretation, any object which is specified to be limited by a clip object is flagged as clipped and maintains a pointer to the associated clip object. As a clipped object is rendered, the renderer determines which portions of the object lie within the clipping path of the associated clip object. The portions of a clipped object inside the clipping path are part of the output image, while portions of the clipped object outside the clipping path are not part of the output image. As an example, in FIG. 2, graphical object 32 and text object 33 are clipped by a diamond-shaped clipping path 31. The portions of objects 32 and 33 which would normally appear outside of the clipping path 31 are clipped and are not part of the output image 40. Likewise, another clip object defines a clipping path 35 around objects 36, 37 and 39.

Figure 3:
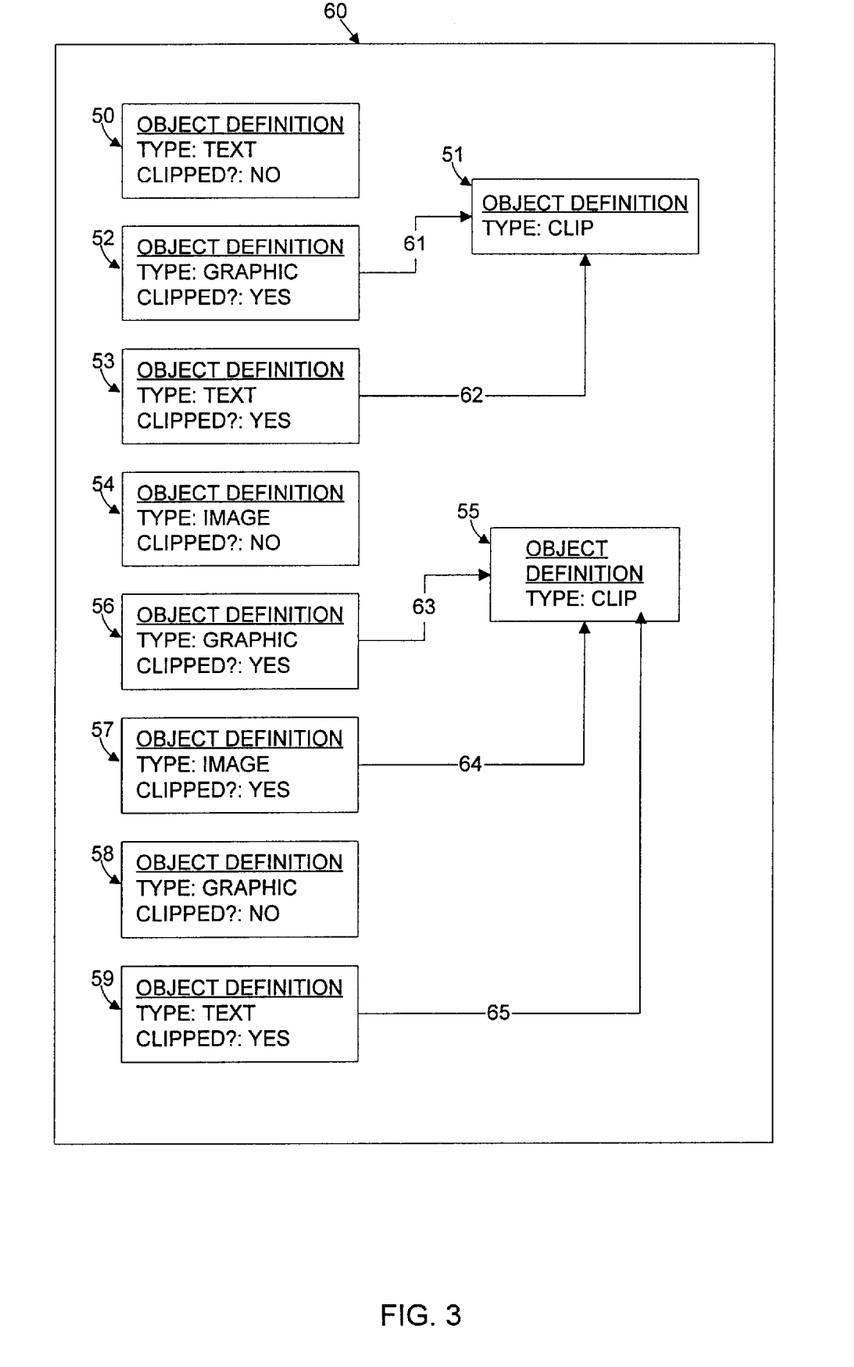
FIG. 3 is a diagram illustrating a sequence of objects corresponding to the image of FIG. 2, as output by a page description interpreter.

FIG. 3 illustrates an example set 60 of object definitions 50–59. Object definitions 50–59 would be the output of the page description interpreter 22 in FIG. 1. The specific object definitions 50–59 in FIG. 3 correspond, respectively, to objects 30–39 shown in the rendered image 40 of FIG. 2.

In FIG. 3, each object definition 50–59 has an associated object type, indicated by its "Type" field. An object type may be either text, graphic, image or clip. Object definitions which are not clip objects also contain an associated clipped flag, indicated by the "Clipped" field. The object's clipped flag indicates whether the object is clipped by any clip object by an appropriate value, e.g., "Yes" or "No", "1" or "0", or by a reference, such as a pointer, to the clip object as indicated at 61–65. For example, object definition 50, corresponding to object 30 in FIG. 2, is a text object definition and is not clipped. Object definition 57 is an image object and is clipped, and therefore makes reference to the clip object 55.

It should be apparent that multiple objects may be clipped by a single clip object definition. For example, objects 32 and 33 in FIG. 2, corresponding to object definitions 52 and 53 in FIG. 3, have a clipping path 31 which is defined by clip object definition 51. Likewise, objects 36, 37 and 39, corresponding to object definitions 56, 57 and 59 have a clipping path defined by clip object definition 55. Clip object definitions 51 and 55 are output by the interpreter prior to the objects which they clip. For clarity, the object definitions 50–59 shown in FIG. 3 only show the object definition information related to the object that is relevant to the invention. An object definition generally contains various other fields of data such as data needed to produce the output image.

Object definitions can be generated by any page description language interpreter. In one embodiment, the interpreter may generate several object definitions for each sampled image rather than a single object definition. Generally speaking, the interpreter knows, before processing the sampled image, how many pixels the image contains. The image also is presented to the interpreter as a series of scan lines. The interpreter can read a predetermined number of these scan lines based on the number of pixels in the sampled image. A different image object may be output for each set of scan lines. Processing object definitions for sampled images in this manner may further reduce memory swapping.

In the present invention, as a page description is processed by an interpreter, object definitions are output from the interpreter into a working display list by a display list processor. As object definitions are received by the display list processor, the occurrence or non-occurrence of some conditions may indicate when to render and clear the current working display list. These conditions include a change in the clipping state of object definitions in the display list, an increase in size of the display list beyond a predetermined limit, and output of an image object definition from the interpreter. This set of conditions is neither exhaustive nor limiting of the present invention.

Figure 4:
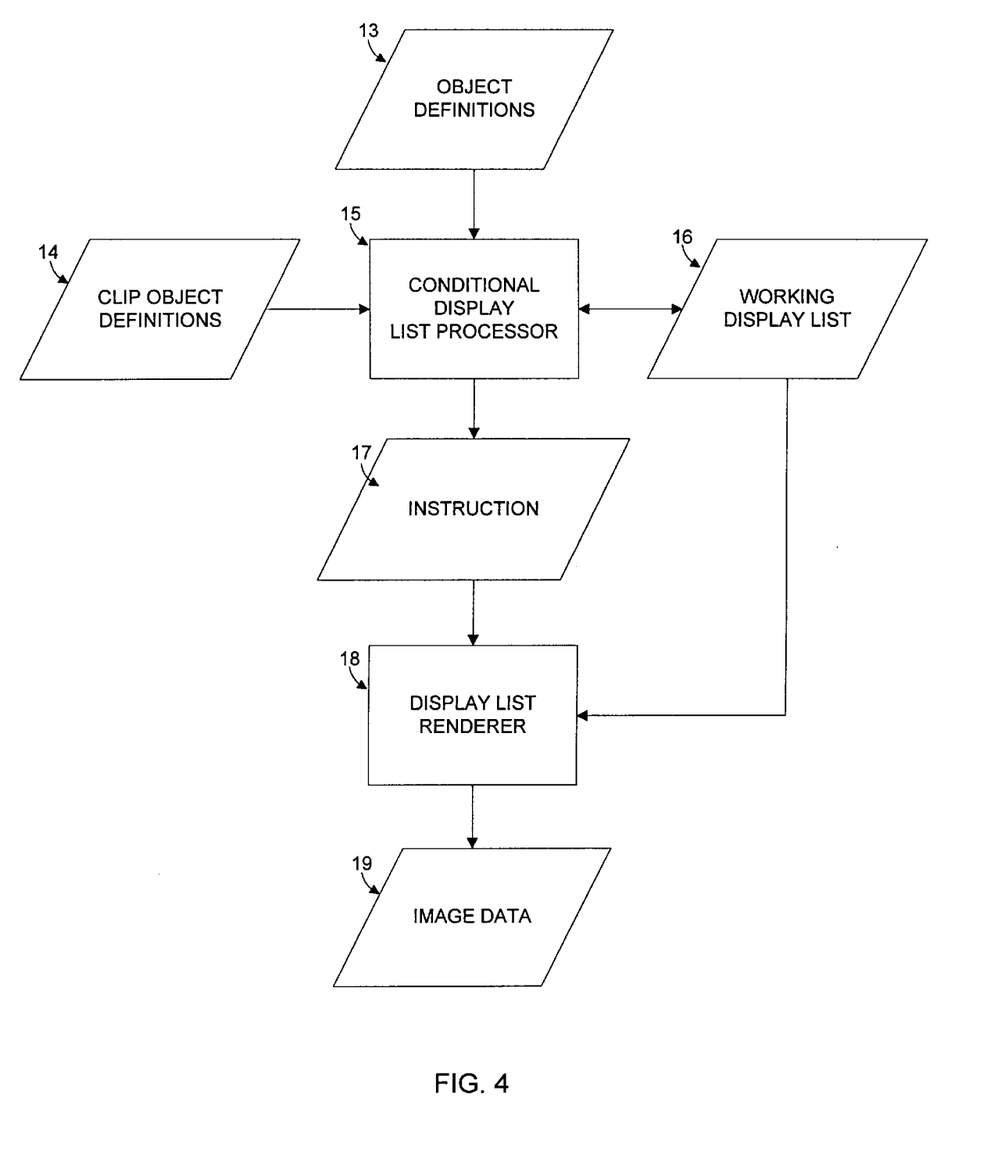
FIG. 4 is a more detailed diagram illustrating data flow and processing for the display list processor of the present invention.

One embodiment of the invention is shown in FIG. 4. In this embodiment, a conditional display list processor 15 processes object definitions 13 as they are output from an interpreter (not shown). Generally, the conditional display list processor 15 creates a working display list 16 of text and graphic object definitions. Clip objects are stored in memory as indicated at 14 and are referenced by text, image and graphic objects. The display list is referred to as a working display list since it is periodically rendered and cleared, depending upon various conditions as noted above.

The display list may be implemented, for example, as a stack, queue, array, linked list or other appropriate structure. When certain conditions are met, as will be explained in more detail below, the conditional display list processor 15 sends an instruction 17 to a display list renderer 18. The display list renderer 18 receives the instruction 17 and the working display list 16. The display list renderer 18 renders each object definition 13 in the working display list 16 to produce the image data 19. Generally, rendered image data 19 is output into a frame buffer (not shown), and may be printed, displayed, stored, or further processed.

There are several conditions which cause the working display list 16 to be rendered. For example, if an image object definition is received, the conditional display list processor 15 may instruct the display list renderer 18 to render and clear the display list 16. The image object itself then is rendered. It also is possible that several image objects will be processed in sequence. The working display list is rendered and cleared upon receipt of an image object definition so that sampled image data can be processed efficiently.

The display list 16 also may be rendered and cleared when the size of the display list 16 exceeds a predetermined limit, such as may be defined by memory limits for the display list. This conditional rendering keeps memory requirements for any set of object definitions in a display list within a reasonable range, and may reduce memory swapping of the display list.

The display list 16 also may be rendered when the clipping state of objects in the display list changes. In particular, before an object is appended to the display list, if its clipping state is different from the clipping state of objects in the display list, the display list is rendered.

Before any clipped object is added to the working display list, the conditional display list processor 15 ensures that the clip object definition referenced by the clipped object is already in the current working display list. If the clip object definition referenced by the current clipped object is not in the display list, the conditional display list processor 15 obtains a copy of the clip object definition from the set of clip object definitions 14, and adds the copy into the working display list 16. The conditional display list processor then adds the clipped object definition 13. Clipped text, graphic and image object definitions thus are rendered in the same working display list as their corresponding clip object definitions.

By periodically rendering subsets of the objects from a page description, problems associated with the prior art page description processors are overcome. In particular, rendering and clearing the display list upon the occurrence of certain conditions solves some memory problems encountered in the prior art. The working display list may be constructed with multiple object definitions before being rendered, much like an imaging system operating in band mode. However, for processing efficiency, when an image object definition is output from the interpreter, the display list is rendered and cleared immediately. This is similar to frame mode page description processing. Thus, the invention may operate in a band mode-like manner by collecting object definitions in the display list and then may switch to a frame mode-like operation upon the occurrence of conditions, such as detecting an image object. Such dynamic control of when and which object definitions are rendered provides efficiency and speed of page description processing.

Embodiments of the present invention may be implemented, for example, using a digital computer. Various types of computers exist however, and the present invention may be implemented on most of these various types of computers without deviating from the scope of the present invention. For example, page description processing is often implemented within a dedicated computer system such as a laser printer. Such a laser printer may receive a page description and process it according to the present invention. Page description processing also may be performed within a general purpose computer system, such as a personal computer or workstation, and then the rendered image data may be further processed, or displayed, or sent via an interface to a laser or other type of printer for printing. In the later case, the laser printer receives the rendered image data for printing only, and may not need to perform page description processing. In either case, the present invention may be described in relation to both types of computer systems, dedicated and non-dedicated.

Figure 5:
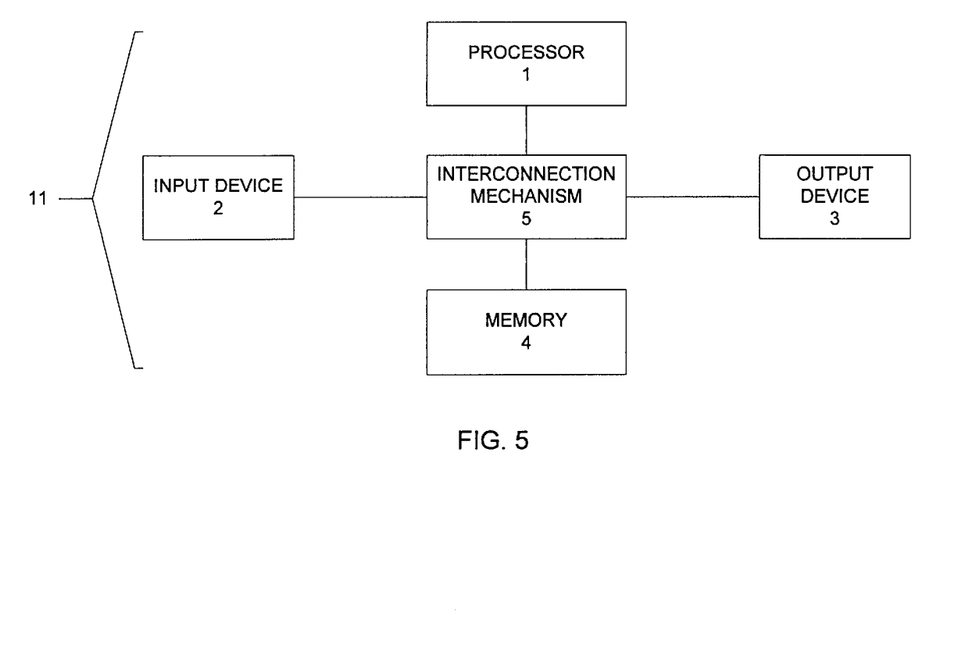
FIG. 5 is a block diagram of an example computer system which may be used for implementing the present invention.

In FIG. 5, computer system 11 may be either a general purpose or dedicated computer system, and includes a processor 1 connected to a memory system 4 via an interconnection mechanism 5. An example of a general purpose computer would be a personal computer or workstation, whereas an example of a dedicated computer would be a laser printer or copier machine. The interconnection mechanism is typically a combination of one or more buses and one or more switches. At least one input device 2 is also connected to the processor and memory system via the interconnection mechanism, as is at least one output device 3.

If the present invention is implemented on a more general purpose-type computer, such as a workstation or personal computer, example output devices 3 may include a cathode ray tube (CRT) display, liquid crystal display (LCD), one or more frame buffers, a file storage device such as a disk, concurrently executing software applications, laser printers including color laser copiers, and communication devices, such as network interfaces or modems. In such a general purpose computer implementation, rendered image data may be produced in the computer and the output device may be another application program executing within the same, or a different computer. The other application program, such as an image processing application, may receive the rendered image data for further image processing. In a dedicated computer system implementing the present invention, such as a computer processor within a laser printer, output devices may include a frame buffer connected to a laser drum apparatus for printing the rendered image data.

It also should be understood that one or more input devices 2 may be connected to the computer system 11. In a dedicated computer such as a laser or other type of printer, example input devices may include a bus extending from a page description interpreter processor, a communication device such as a network interface card within the printer, or an image scanner. In a more general purpose, non-dedicated computer system, input devices may consist of an application program or file which produces or contains a page description. Other variations of input devices known to those skilled in the art now may be apparent and are contemplated as being within the scope of the invention.

In the embodiment previously described with respect to FIG. 4, the invention may be implemented as a routine in software as an integral part of a page description processing program. In such an embodiment, the input device for the invention may be an application programming interface (API) from a routine of the page description interpreter which passes object definitions to the condition detection processor through the API. If an embodiment is incorporated into the entire page description processing program itself, which may include the interpreter, input devices may be files from disk storage, or data from another process executing on the same or a different general purpose computer. In an embodiment which is implemented within a dedicated computer device, such as a laser printer or copier, the input device 2 may be an interface to a network or computer which downloads the page description into the memory 4 for processing. Page description processing may then take place within the laser printer itself, for example.

It should be understood that the invention is not limited to the particular input or output devices used in combination with the computer system or to only those described herein. The input and output devices 2 and 3 may be included within, or external to, a main computer unit which typically houses the processor 1, memory system 4 and interconnection mechanism 5.

The computer system 11 may be programmable using a high level computer programming language, such as "C++" to implement embodiments of the invention. Alternatively, a computer system embodying the present invention may be implemented using specially programmed, special purpose hardware, such as an Application Specific Integrated Circuits (ASICs) or may be implemented as a program in firmware which is accessed by the processor 1 of FIG. 5. When implemented in a dedicated-type computer system such as a printer or copier, the invention would more likely be embodied in an ASIC as hard-wired circuitry, or in firmware which works in conjunction with the processor, memory, interconnection mechanisms and input and output devices. When embodiments are implemented on general purpose computer systems, they may be implemented within software application programs.

In a more general purpose computer system, such as a personal computer or workstation, the processor is typically a commercially available processor, such as the Pentium microprocessor from Intel Corporation. Many other processors are also available. Such general purpose processors execute a program called an operating system, such as the Windows operating system from Microsoft Corporation, which controls the execution of other computer programs and provides scheduling, debugging, input-output control, accounting compilation, storage assignment, data management, memory management, and communication control and related services. The processor and operating system define a computer platform for which application programs in high level programming languages are written. The invention may be embodied as a computer software application program, stored on a computer readable medium such as a disk or in a memory, which provides instructions which execute on the processor of the general purpose computer. It should be understood that the invention is not limited to a particular computer platform, particular operating system, particular processor, or particular high or low level programming language. Additionally, the computer system 11 may be a multiprocessor computer system or may include multiple computers connected over a computer network. In such an embodiment, interpretation for example may be performed on one computer, and condition detection processing of object definitions may be performed on another, with the interconnection mechanism 5, of FIG. 5, being a computer network. Other variations of dividing processing tasks among computers now may be contemplated by those skilled in the art and are meant to be within the scope of the present invention.

Figure 6:
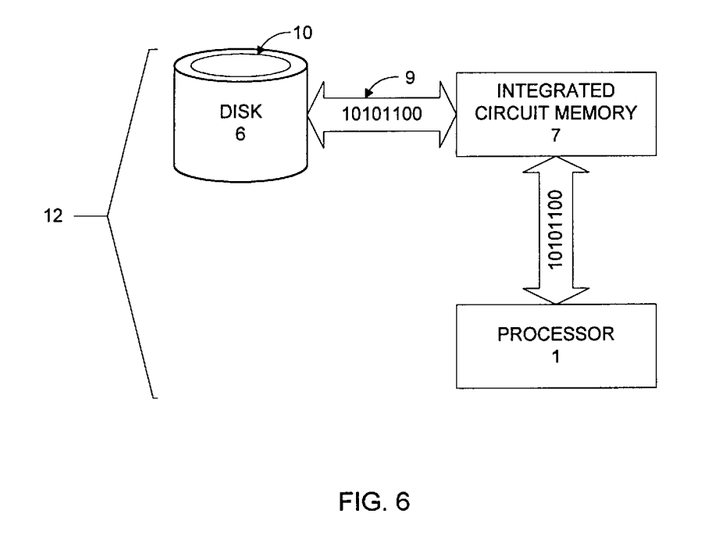
FIG. 6 is a block diagram illustrating a typical memory system for use in the computer system in FIG. 3.

An example memory system 12 will now be described in more detail in connection with FIG. 6. A memory system typically includes a computer readable and writable non-volatile recording medium 6, of which a magnetic disk, a flash memory, and tape are examples. The disk may be removable, known as a floppy disk, and/or permanent, known as a hard disk drive. The disk 6, which is shown in FIG. 6, has a number of tracks 10 in which signals are stored, in binary form, i.e., a form interpreted as a sequence of 1's and 0's, as shown at 9. Such signals may define an application program embodying processing capabilities according to certain embodiments of invention which is executed by the processor 1, or the signals may define information stored on the disk to be processed by the application program, such as page descriptions, display lists, and rendered image data or image information stored in a data file. Typically, in operation, the processor 1 causes data to be read from the non-volatile recording medium 6 into an integrated circuit memory element 7, which is typically a volatile random access memory, such as a dynamic random access memory (DRAM) or static memory (SRAM). The integrated circuit memory element 7 allows for faster access to the information by the processor 1 and disk 6, and is typically called the system memory. The processor generally causes the data to be manipulated within the integrated circuit memory 7 and copies the data to the disk 6 if modified, when processing is completed. A variety of mechanisms are known for managing data movement between the disk 6 and the integrated circuit memory 7, and the invention is not limited thereto. It should also be understood that the invention is not limited to a particular memory system. As previously mentioned, the present invention may be embodied in a variety of configurations of computer systems, both dedicated and non-dedicated, and within part of, or as the entire computer system itself, or only as a portion of an application program or process executing within the overall computer system. The former descriptions of various embodiments are not meant to limit the invention to one configuration or another.

The embodiments described in relation to FIG. 4 may be implemented upon one of the computer platforms described in relation to the embodiments show in FIGS. 5 and 6. On a general purpose computer platform, the interpreter may be contained within an application program which serves as an input device to the conditional display list processor 15, which may also execute within the same or a different program or process on the processor 1 of FIG. 5. The output device 3 of FIG. 5 may be another software application or process within the same application as the interpreter. In a dedicated computer, such as a laser printer system, the interpreter may serve as an input device and may exist as a separate dedicated processor within the dedicated computer, or may be a process executing on processor 1 within the printer. Alternatively, in a dedicated computer system, object definitions may be supplied from an interpreter executing on a remote processor or remote computer which may serve as the input device. The output device may be a frame buffer which accepts the rendered image data, or alternatively, the output device may be the image rendering mechanism itself, such as the display list renderer 18 in FIG. 4. Whether the computer is a general purpose or dedicated system, in this embodiment, the conditional display list processor 15 of FIG. 4 executes within the processor 1 of the computer system 11 of FIG. 5. The conditional display list processor 15 handles the processing of object definitions 13 and the working display list 16, and upon occurrence of a condition which requires the display list to be rendered, instructs an object rendering mechanism such as display list renderer 18 to handle the rendering operation.

Figure 7:
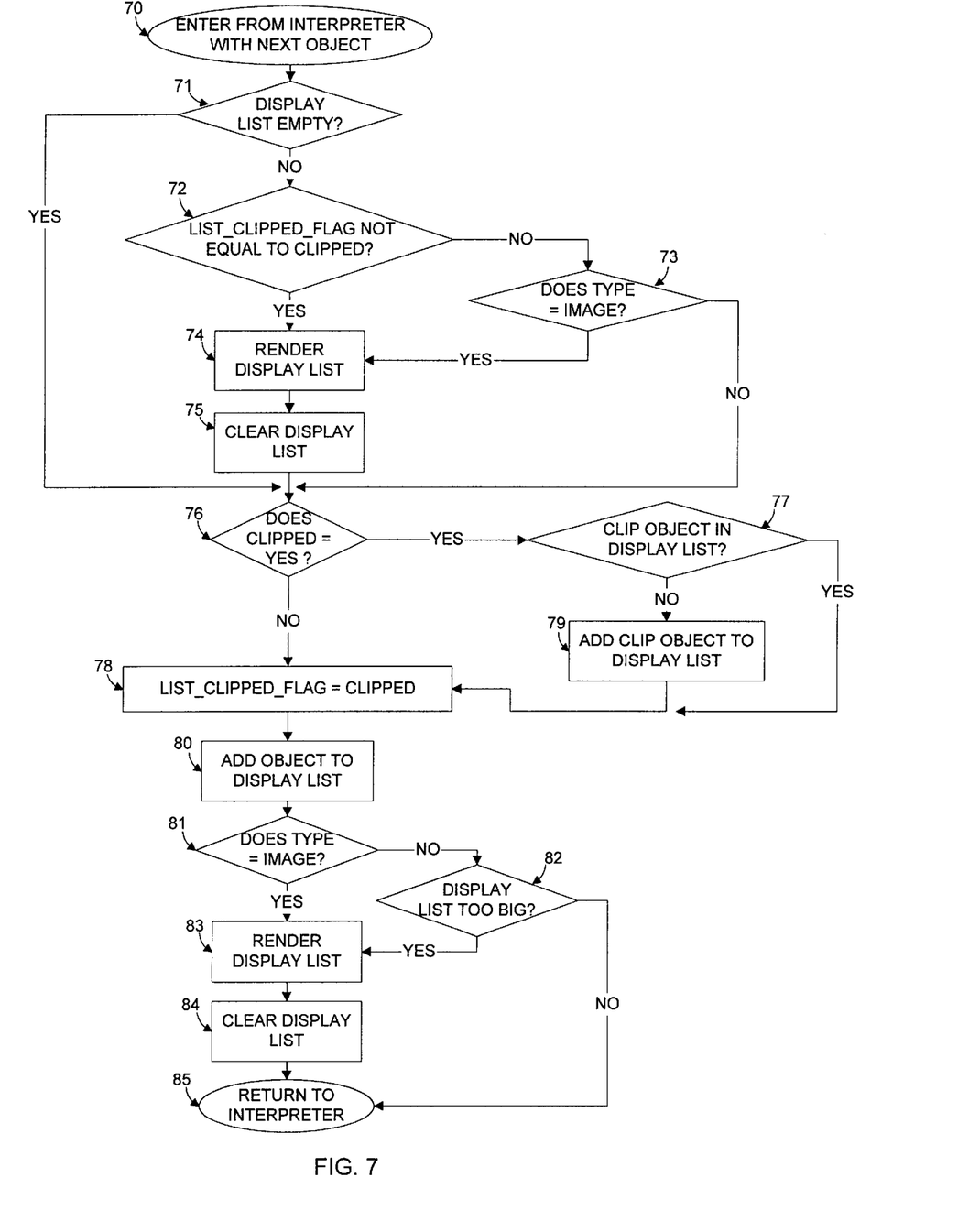
FIG. 7 is a flowchart describing how conditional processing of object definitions is handled for one embodiment of the present invention.

FIG. 7 is a flowchart describing operation of an example embodiment of the conditional display list processor 15 of FIG. 4. The processing steps of FIG. 7 may be performed concurrently with the interpretation of a page description and the rendering of the display list. Likewise, the steps shown in FIG. 7 also may be performed by the display list processor 24 of FIG. 1. In either instance, in the following description, the term processor refers to the computer apparatus which executes the processing tasks associated with the steps shown in FIG. 7.

Each object definition received from the interpreter, while being processed by steps 70–85 of FIG. 7, may be referred to as the current object. During interpretation of a page description, each object definition output from the interpreter is received by the processor at step 70. The processor then determines, in step 71, whether the display list is empty. If the display list contains at least one object definition, the clipping state of the display list (maintained in a flag called the "list_clipped_flag") is compared, in step 72, to the "clipped" flag of the current object definition. If the list_clipped_flag is not equal to the current object's clipped flag, then the clipping state of the display list has changed with the current object. If the clipping state of the display list has changed, the processor instructs the display list renderer 18, of FIG. 4, to render and clear any object definitions in the current working display list in steps 74 and 75. Otherwise, if the clipping state of the display list has not changed, then the type field of the current object is examined in step 73 to determine if the object definition defines an image. If the object type is an image, the processor instructs the display list renderer 18, of FIG. 4, to render and clear the current working display list in steps 74 and 75.

Otherwise, if the display list was empty when the current object definition was received from the interpreter (step 71) or after the display list is rendered and cleared (steps 74 and 75), or if the object is not an image (step 73), then the clipped flag of the current object definition is examined by the processor in step 76. If the object definition is clipped, then the processor determines, in step 77, whether the clip object definition, associated with the current object definition, is present in the display list. If the display list does not contain the clip object definition associated with the current object, the processor adds a copy of the referenced clip object definition to the display list in step 79. If the clip object corresponding to the current object definition is in the working display list, step 79 is skipped and processing proceeds to step 78. If the processor, in step 76, detects that the current object definition processed is not clipped, processing proceeds directly to step 78.

In step 78, the processor sets the list clipped flag to the value of the clipped flag of the current object definition. The processor maintains the appropriate setting for the list_clipped_flag in step 78, so that changes in the clipping state of the display list may be detected on subsequent iterations, in step 72. Next, the processor adds the current object definition to the display list in step 80. The processor then determines in step 81 if the type of the object definition just added is an image, and if so, the processor instructs the display list renderer 18 of FIG. 4 to render and clear the current working display list in steps 83 and 84. In step 81, if the current object definition's type is not an image, the processor determines the size of the current working display list in step 82. If the current working display list exceeds a predetermined size, the processor instructs the display list renderer 18 of FIG. 4 to render and clear the current working display list in steps 83 and 84. However, if the processor, in step 82, determines that the current working display list does not exceed the predetermined size, the processor returns control to the interpreter at step 85 in order to obtain the next object definition interpreted from a page description.

It also is possible to process image object definitions in a manner which simplifies the processing described in FIG. 7. In particular, as shown in step 73 of FIG. 7, when image object definitions are detected, the display list can be rendered and cleared. Rather than performing steps 74 and 75 as illustrated and proceeding with the remaining steps, the image object simply can be rendered into the frame buffer immediately after the current display list is rendered cleared without adding any image objects to the display list. In such an embodiment, step 80 is immediately followed by step 82, which would replace step 81 in the flow diagram. In addition, in this embodiment, an image object is not added to an empty display list as would be implied by steps 71 to 80. Accordingly, the test of step 73 may be made the first step of the flowchart.

In the foregoing embodiments, three conditions cause the display list to be rendered and cleared. If the clipping state of the display list changes or an image object definition is detected, the display list is rendered and cleared before adding the new object definition to the display list. If the addition of the object definition causes the display list to exceed a predetermined size, the display list is also rendered and cleared. This embodiment also ensures that any clip object definitions, which correspond to object definitions which are clipped, added to the working display list before the addition of the clipped object definitions. Ensuring the presence of the associated clip object definition in the display list before adding the clipped object definition obtained from the interpreter allows clipped object definitions to reference their clip object definitions previously rendered and cleared in a former working display list. Furthermore, a single clip object definition may be referenced by multiple object definitions subject to clipping. This embodiment eliminates any requirement that a clipped object be immediately preceded by its corresponding clip object definition.

An example application of the process of FIG. 7 to a set of object definitions will now be described. The set of object definitions 60 shown in FIG. 3 will be used as example object definitions output from the interpreter. Each of the object definitions 50–59 (not 51 or 55) shown in FIG. 3 is received sequentially by the conditional display list processor (the processor) at step 70 of FIG. 7, and processed through steps 70–85. The clip object definitions 51 and 55 are not processed directly from the interpreter at step 70 in this embodiment, but are stored at 14 as shown in FIG. 4. In FIG. 7, only the non-clip type objects are passed to step 70. In FIG. 7, when object definition 50 is received by the processor at step 70, the display list is empty. Therefore, processing proceeds from step 71 to step 76. Since object definition 50 is not clipped, the processor sets the list__clipped__flag to false in step 78. The processor, in step 80, then adds object definition 50 to the working display list and step 81, 82 and 85 are processed without event. Next, the interpreter outputs graphic object definition 52 to the processor. The display list is not empty and so processing proceeds through step 71 to step 72. The list clipped flag, previously set false from the processing of object definition 50, will not equal the clipped flag of graphic object definition 52. Thus, the display list containing object definition 50 is rendered and cleared by the display list renderer, as instructed by the processor in steps 74 and 75, and processing proceeds to step 76. Since object 52 is clipped, and the clip object 51 is not in the display list, clip object definition 51 is added to the display list in step 79 and processing proceeds to step 78. The list__clipped__flag is set true in step 78 and the processor adds graphic object definition 52 to the display list in step 80 and processing proceeds through steps 81, 82 and 85. Text object definition 53 is processed onto the display list by the processor with steps 70–85 in a similar manner as object definition 52, but step 79 is skipped because object definitions 52 and 53 each contain respective clip pointers 61 and 62 which allow these clipped object definitions to reference the clip object definition 51, which is already in the display list.

Upon receipt of image object definition 54 from the interpreter by the processor at step 70, processing proceeds through step 71 to step 72. The list__clipped__flag, which is true, is not equal to the clipped flag of object definition 54. Accordingly, the display list is rendered and cleared by the processor instruction to the display list renderer in steps 74 and 75. Next, image object definition 54 is added to the display list in step 80 and the processor detects the image object in step 81. The display list, only containing image object definition 54, is then rendered by the renderer in step 83 and cleared in step 84, as instructed by the display list processor. The remaining object definitions 56–59 shown in FIG. 3 are processed in a similar fashion as described for object definitions 50–54.

When object definition 59 is received by the processor at step 70, the processor detects a change in the list__clipped__flag in step 72 and calls the display list renderer to render and clear the display list in steps 74 and 75. At step 76, since text object definition 59 is clipped, step 77 is performed to determine if clip object definition 55 is in the display list. The clip object pointer 65 allows the processor to identify the clip object 55 in step 77, even though clip object definition 55 was previously rendered and cleared from the display list. The processor, in step 77, then determines that clip object definition 55 is not in the display list, and adds a copy of clip object definition 55 to the display list before adding clipped text object definition 59.

Figure 8:
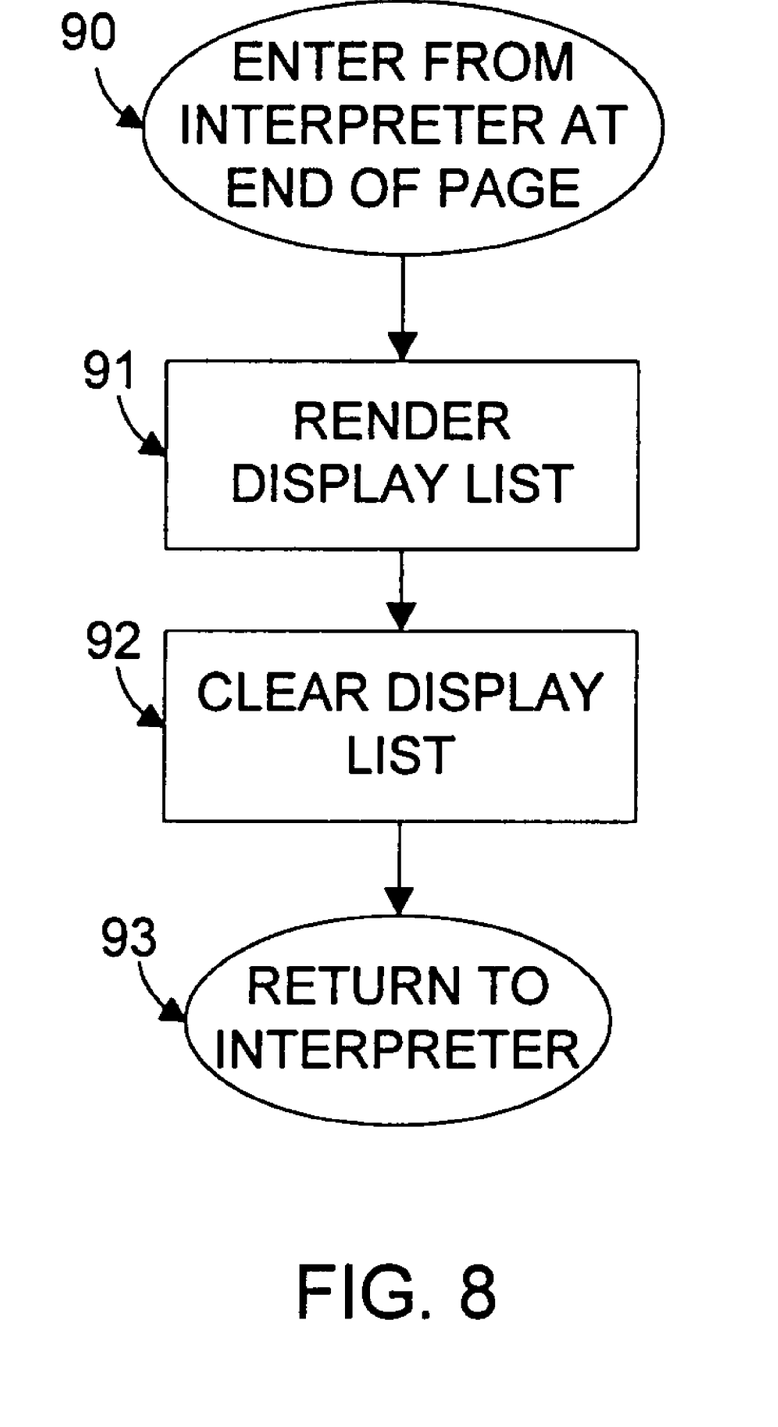
FIG. 8 is a flowchart describing how processing is handled upon detecting the end of a page for one embodiment of the present invention.

After processing object definition 59, processing returns to the interpreter at step 85. The page description interpreter then detects an "end of page marker" which occurs in the page description. Steps 90 through 93 of FIG. 8 show page description processing steps performed by the processor upon detection of an end of page marker. Step 90 is entered from interpreter and processing proceeds to step 91, where the processor sends an instruction to the display list renderer to render any remaining object definitions in the display list. In the previous example of processing object definitions 50–59 of FIG. 3, clip object definition 55 and text object definition 59 remain in the display list upon detection of the end of page marker. These object definitions in the display list are passed to the renderer by the processor in step 91. After step 91, the processor, in step 92, clears the display list and then processing returns to the interpreter in step 93. The clearing of the display list also may be done by the display list renderer. If subsequent pages exist in the page description, the processing described in connection with FIG. 7 repeats for the next page of the page description.

Another aspect of this embodiment of the invention which was not executed by the processor in the previous processing example was step 82. In step 82, the processor instructs the display list renderer to render and clear the display list. The render instruction is given after an object definition has been added to the display list and if the display list exceeds a predetermined size. The determination of the size of the display list may be based on the amount of memory used, or on the number of object definitions contained within the current working display list. Alternatively, display list size may be computed by tracking certain numbers of specific types or combinations of object definitions within the working display list. By using one or more of these computed values, a determination may be made whether or not to instruct the display list renderer to render and clear the display list. By providing conditional rendering, parameters may be altered in order to adjust how frequently the display list is rendered and cleared based on its size or contents.

In another embodiment of the invention, processing of page descriptions may be improved by concurrently processing tasks. For example, each time the interpreter produces another object definition from its interpretation of the page description, the processing steps of the conditional display list processor in FIG. 7 may be re-entered at step 70. In an alternative embodiment, the interpreter may already have another object definition queued and waiting to be processed by the steps of FIG. 7. The interpreter may continue interpreting the page description while current object definitions can be processed into the display list from a queue of previously output object definitions. Likewise, concurrent or parallel processing is possible after a rendering operation is initiated in one of steps 74 or 83. Since groups of objects may be rendered in small sets the objects output by the interpreted may continue to be processed into a display list while a separate rendering mechanism accepts and renders the display list passed to it from the processor in steps 74 or 83.

Those skilled in the art will now understand that there may be various orders in which the steps of FIG. 7 may be performed, while retaining the overall functionality of the various embodiments of the invention. Such modifications are meant to be within the scope of the invention.

The rendering of subsets of object definitions from the set of object definitions obtained by interpreting a page description, upon the occurrence of certain conditions, improves overall performance of page description and image processing. The aforementioned techniques reduce the amount of time and memory needed to perform page description processing.

The foregoing embodiments are merely illustrative and not meant to be limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer implemented process for processing a document, defined in a page description language, comprising a step of using a page description interpreter to generate a sequence of object definitions specifying corresponding objects in the document, and further comprising steps of, for each received object definition in the sequence of object definitions:

detecting an occurrence of a condition created by the received object definition;

conditionally adding the received object definition to a display list according to the condition detected; and rendering the entire display list, irrespective of whether the received object definition is the last in the sequence of object definitions, when an occurrence of the condition is detected.

2. The computer implemented process of claim 1, wherein the step of detecting includes a step of detecting an occurrence of a characteristic of the received object definition.

3. The computer implemented process of claim 2, wherein the step of detecting includes the steps of detecting whether the received object definition defines a sampled image and, when the received object definition is a sampled image, rendering the entire display list and then the sampled image to provide at least a portion of output image data.

4. The computer implemented process of claim 2, wherein the step of using the page description interpreter, one of the steps of detecting and conditionally adding, and the step of rendering are performed in parallel, concurrently with each other.

5. The computer implemented process of claim 2, wherein:

each received object definition has a clipping state indicating whether the corresponding object is clipped;

the step of detecting includes a step of detecting whether the clipping state of the object definitions in the display list is different from the clipping state of the received object definition; and the computer implemented process further includes a step of rendering the entire display list to provide at least a portion of output image data when object definitions in the display list have a clipping state that is different from the clipping state of the received object definition.

6. The computer implemented process of claim 5, further comprising steps of determining whether the received object definition has a corresponding clip object and, when the received object definition has a corresponding clip object, ensuring a clip object definition for the clip object is in the display list.

7. The computer implemented process of claim 6, wherein the step of ensuring includes the steps of:

identifying the clip object definition corresponding to the received object definition;

determining whether the identified clip object definition exists in the display list; and adding the identified clip object definition to the display list when the identified clip object definition does not exist in the display list.

8. The computer implemented process of claim 7, wherein the received object definition has a clipping state indicating whether the object is clipped by a nonrectangular clipping path.

9. The computer implemented process of claim 2, further comprising the steps of detecting whether the display list has exceeded a predetermined size and rendering and clearing the entire display list when the display list exceeds the predetermined size.

10. A computer system for processing a document, defined in a page description language, comprising:

means for generating a sequence of object definitions corresponding to objects defined in the document;

means for detecting an occurrence of a condition created by a received object definition and conditionally adding the received object definition to a display list according to the condition detected; and means for rendering the entire display list when an occurrence of the condition is detected, irrespective of whether the received object definition is the last in the sequence of object definitions.

11. The computer system of claim 10, wherein the condition is a characteristic of the received object definition.

12. The computer system of claim 11, wherein the condition is whether the received object definition defines a sampled image and wherein the means for rendering renders the entire display list and then sampled image to provide at least a portion of output image data.

13. The computer system of claim 11, wherein the page description interpreter, the display list processor, and the display list renderer function in parallel, concurrently with each other.

14. The computer system of claim 11, wherein:
  each received object definition has a clipping state indicating whether the corresponding object is clipped;
  the display list processor includes means for detecting whether the clipping state of the object definitions in the display list is different from the clipping state of the received object definition; and
  the computer system further includes means for rendering the entire display list to provide at least a portion of output image data when object definitions in the display list have a clipping state that is different from the clipping state of the received object definition.

15. The computer implemented process of claim 14, further comprising means for determining whether the received object definition has a corresponding clip object and means for ensuring a clip object definition for the clip object is in the display list when the received object definition has a corresponding clip object.

16. The computer system of claim 15, wherein the means for ensuring includes:
  means for identifying the clip object definition corresponding to the received object definition;
  means for determining whether an identified clip object definition exists in the display list; and
  means for adding the identified clip object definition to the display list when the identified clip object definition does not exist in the display list.

17. The computer implemented process of claim 16, wherein the received object definition has a clipping state indicating whether the object is clipped by a nonrectangular clipping path.

18. The computer system of claim 11, further comprising means for detecting whether the display list has exceeded a predetermined size and means for rendering and clearing the entire display list when the display list exceeds the predetermined size.

* * * * *

UNITED STATES PATENT AND TRADEMARK OFFICE
CERTIFICATE OF CORRECTION

PATENT NO. : 5,959,867
DATED : September 28, 1999
INVENTOR(S) : Speciner et al

It is certified that error appears in the above-identified patent and that said Letters Patent is hereby corrected as shown below:

| Column | Line No. | |
|---|---|---|
| Cover page | at [75] | Inventor Carl Mikkelsen is from "Wayland, Mass." not Sudbury |
| 11 | 38 | The word "are" should be added after the comma to read "..which are clipped, are added to the working display list before..." |
| 13 | 33 | A comma should appear after the word "sets" to read "...groups of objects may be rendered in small sets, the objects..." |
| 13 | 34 | The word "interpreted" should read "interpreter" |

Signed and Sealed this

Thirteenth Day of June, 2000

Attest:

Q. TODD DICKINSON

*Attesting Officer*     *Director of Patents and Trademarks*